United States Patent
Sanchez

(10) Patent No.: US 11,852,495 B1
(45) Date of Patent: Dec. 26, 2023

(54) COMPUTATIONAL MODEL FOR CREATING PERSONALIZED ROUTES BASED AT LEAST IN PART UPON PREDICTED TOTAL COST OF CLAIM FREQUENCY OR SEVERITY

(71) Applicant: BlueOwl, LLC, San Francisco, CA (US)

(72) Inventor: Kenneth Jason Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 701 days.

(21) Appl. No.: 16/883,436

(22) Filed: May 26, 2020

(51) Int. Cl.
| | | |
|---|---|---|
| G01C 21/34 | (2006.01) | |
| G06Q 50/26 | (2012.01) | |
| G06Q 40/08 | (2012.01) | |
| G01C 21/36 | (2006.01) | |
| G06N 3/08 | (2023.01) | |
| G06N 3/044 | (2023.01) | |

(52) U.S. Cl.
CPC ..... *G01C 21/3484* (2013.01); *G01C 21/3461* (2013.01); *G01C 21/3691* (2013.01); *G06N 3/044* (2023.01); *G06N 3/08* (2013.01); *G06Q 40/08* (2013.01); *G06Q 50/265* (2013.01)

(58) Field of Classification Search
CPC ............ G01C 21/3484; G01C 21/3461; G01C 21/3691; G06N 3/0445; G06N 3/08; G06N 3/044; G06Q 40/08; G06Q 50/265
USPC ....................................................... 701/423
See application file for complete search history.

(56) References Cited

U.S. PATENT DOCUMENTS

| | | | |
|---|---|---|---|
| 7,546,206 B1 | 6/2009 | Miller et al. | |
| 7,996,345 B2 | 8/2011 | Golding et al. | |
| 10,096,038 B2 | 10/2018 | Ramirez et al. | |
| 10,107,635 B2 | 10/2018 | Larner et al. | |
| 10,830,605 B1 * | 11/2020 | Chintakindi | ....... G01C 21/3484 |

(Continued)

FOREIGN PATENT DOCUMENTS

| | | |
|---|---|---|
| WO | 2008/050018 A2 | 5/2008 |
| WO | WO-2016135561 A1 * | 9/2016 |

OTHER PUBLICATIONS

"RouteWise", Tnedicca, Retrieved from , <https://www.youtube.com/watch?v=2iJmRqB7pco>, Dec. 2017, 2 pages.

*Primary Examiner* — Isaac G Smith
(74) *Attorney, Agent, or Firm* — Faegre Drinker Biddle & Reath LLP

(57) ABSTRACT

Systems and methods are provided for providing recommendations of safe driving routes that are tailored to the driving habits of particular drivers. A machine learning model (e.g., an artificial neural network) may be trained using data indicative of insurance claim severity, road conditions, and/or vehicle telematics data associated with vehicle-related incidents, such as vehicle collisions. The machine learning model may be trained to identify road types and conditions that are predictive of claim frequency and severity. Any given driving route(s) may be provided to the trained machine learning model, and a risk value may be computed for the route(s). By further applying a personalized driver profile to the calculations of risk, personalized risk values may be computed for the route(s), and a safest route may be recommended to a driver.

20 Claims, 10 Drawing Sheets

(56) References Cited

U.S. PATENT DOCUMENTS

| | | | |
|---|---|---|---|
| 2016/0033293 A1* | 2/2016 | Nobrega | G01C 21/3461 |
| | | | 701/428 |
| 2019/0066223 A1 | 2/2019 | Bogovich et al. | |
| 2019/0389483 A1* | 12/2019 | Likhterman | B60W 50/0098 |
| 2020/0286391 A1* | 9/2020 | Beaurepaire | G08G 5/0091 |
| 2021/0023990 A1* | 1/2021 | Lynar | B60Q 9/00 |
| 2021/0256616 A1* | 8/2021 | Hayward | G06V 30/194 |

* cited by examiner

COMPUTATIONAL MODEL FOR CREATING PERSONALIZED ROUTES BASED AT LEAST IN PART UPON PREDICTED TOTAL COST OF CLAIM FREQUENCY OR SEVERITY

FIELD OF THE DISCLOSURE

The present disclosure generally relates to generation of driving routes, and particularly, to generation of personalized routes that are safest for drivers.

BACKGROUND

For automobile drivers, risk experienced while driving is a serious concern. A driver may, for example, want to mitigate risk by avoiding certain routes that have poor visibility, poor lines of sight, unprotected left turns, sharp curves, risk of collision with other vehicles, risk of collision with animals, etc. Given a choice among multiple available routes between a given origin and destination, the driver might prefer to use the safest of the available routes, even if the safest route is slightly longer in terms of time, distance, or both.

However, because the driving habits of drivers may vary, a given hazard on a road may present a more significant threat to some drivers than the same hazard does to other drivers. For example, a driver who tends to follow posted speed limits may have less risk of going off the road while handling a sharp curve, relative to another driver who often does not observe posted speed limits. As another example, drivers who follow closely behind or "tailgate" other drivers will be at more risk of vehicle collision during heavy "bumper-to-bumper" traffic, relative to other drivers who leave adequate space between their respective vehicles and the vehicles in front of them. As a result, a route that one driver considers risky may be considerably less risky (or more risky) to another driver. Existing techniques for evaluating risk associated with driving routes do not account for how particular drivers tend to handle particular roads and risks.

BRIEF SUMMARY

Generally, the present disclosure describes systems and methods for determining personalized risk values associated with driving routes. A supervised machine learning model may be trained to identify road types and/or road conditions that are predictive of frequency of insurance claims and/or severity of insurance claims. The supervised machine learning model may include, for example, an artificial neural network, a k-nearest neighbors algorithm, a naïve Bayes model, a support-vector machine, a decision tree, and/or combinations of the above. The trained machine learning model may be utilized to determine "base risk values" associated with respective road segments (e.g., portions of routes, such as intersections, curves, straightaways, etc., under various conditions such as heavy traffic, light traffic, precipitation, etc.). Additionally, personalized driving profiles may be generated to identify driving habits of respective drivers (e.g., habits of drivers on particular types of roads and/or in particular weather or traffic conditions). For any given driving route sought by a particular driver, the trained machine learning model may be applied determine a risk value for the route ("base risk"). Moreover, by further applying a personalized risk profile to the machine learning model, a personalized risk value may be determined for the route, taking into account the base risk as well as driving habits of the particular driver. For any given situation where two or more possible routes exist between an origin and a destination, a safest route for the particular driver may be selected, and navigation along the safest route may be provided.

In one embodiment, a computer-implemented method may be provided for determining personalized risk associated with a driving route. The method may include (1) training, by one or more processors and using labeled training data indicative of risk associated with operation of vehicles, a machine learning model to determine base risk values associated with road segments, (2) obtaining, by the one or more processors, a personalized driver profile corresponding to a particular driver, the personalized driver profile being based at least in part upon vehicle telematics data indicative of operation of one or more vehicles by the particular driver, (3) receiving, by the one or more processors, via an electronic computing device corresponding to the particular driver, an indication of one or more driving routes corresponding to the particular driver, each of the one or more driving routes comprising a respective plurality of road segments, (4) determining, by the one or more processors, for each of the one or more routes, a respective personalized risk value associated with the respective route, at least by processing the plurality of road segments using the trained machine learning model and the personalized driver profile, and/or (5) causing, via the one or more processors, for at least one of the one or more routes, an indication of the respective personalized risk value of the route to be displayed at a graphical user interface of the electronic computing device. The method may include additional, alternate, or fewer elements, including those described herein.

In another embodiment, a computer system may be configured to determine personalized risk associated with a driving route. The computer system may include (1) one or more processors, and (2) one or more memories storing computer-executable instructions that, when executed via the one or more processors, cause the computer system to (i) train, using labeled training data indicative of risk associated with operation of vehicles, a machine learning model to determine base risk values associated with road segments, (ii) obtain a personalized driver profile corresponding to a particular driver, the personalized driver profile being based at least in part upon vehicle telematics data indicative of operation of one or more vehicles by the particular driver, (iii) receive, via an electronic computing device corresponding to the particular driver, an indication of one or more driving routes corresponding to the particular driver, each of the one or more driving routes comprising a respective plurality of road segments, (iv) determine, for each of the one or more routes, a respective personalized risk value associated with the respective route, at least by processing the plurality of road segments using the trained machine learning model and the personalized driver profile, and/or (v) cause, for at least one of the one or more routes, an indication of the respective personalized risk value of the route to be displayed at a graphical user interface of the electronic computing device. The computer system may include additional, fewer, or alternate components or functions thereof, including those described herein.

In yet another embodiment, one or more non-transitory, computer-readable media may be provided for determining personalized risk associated with a driving route. The one or more computer-readable media may store instructions that, when executed by one or more processors, cause the one or more processors to: (1) train, using labeled training data indicative of risk associated with operation of vehicles, a machine learning model to determine base risk values associated with road segments, (2) obtain a personalized driver profile corresponding to a particular driver, the personalized driver profile being based at least in part upon vehicle telematics data indicative of operation of one or more vehicles by the particular driver, (3) receive, via an electronic computing device corresponding to the particular driver, an indication of one or more driving routes corresponding to the particular driver, each of the one or more driving routes comprising a respective plurality of road segments, (4) determine, for each of the one or more routes, a respective personalized risk value associated with the respective route, at least by processing the plurality of road segments using the trained machine learning model and the personalized driver profile, and/or (5) cause, for at least one of the one or more routes, an indication of the respective personalized risk value of the route to be displayed at a graphical user interface of the electronic computing device. The one or more non-transitory computer-readable media may include additional, fewer, or alternate instructions, including those described herein.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
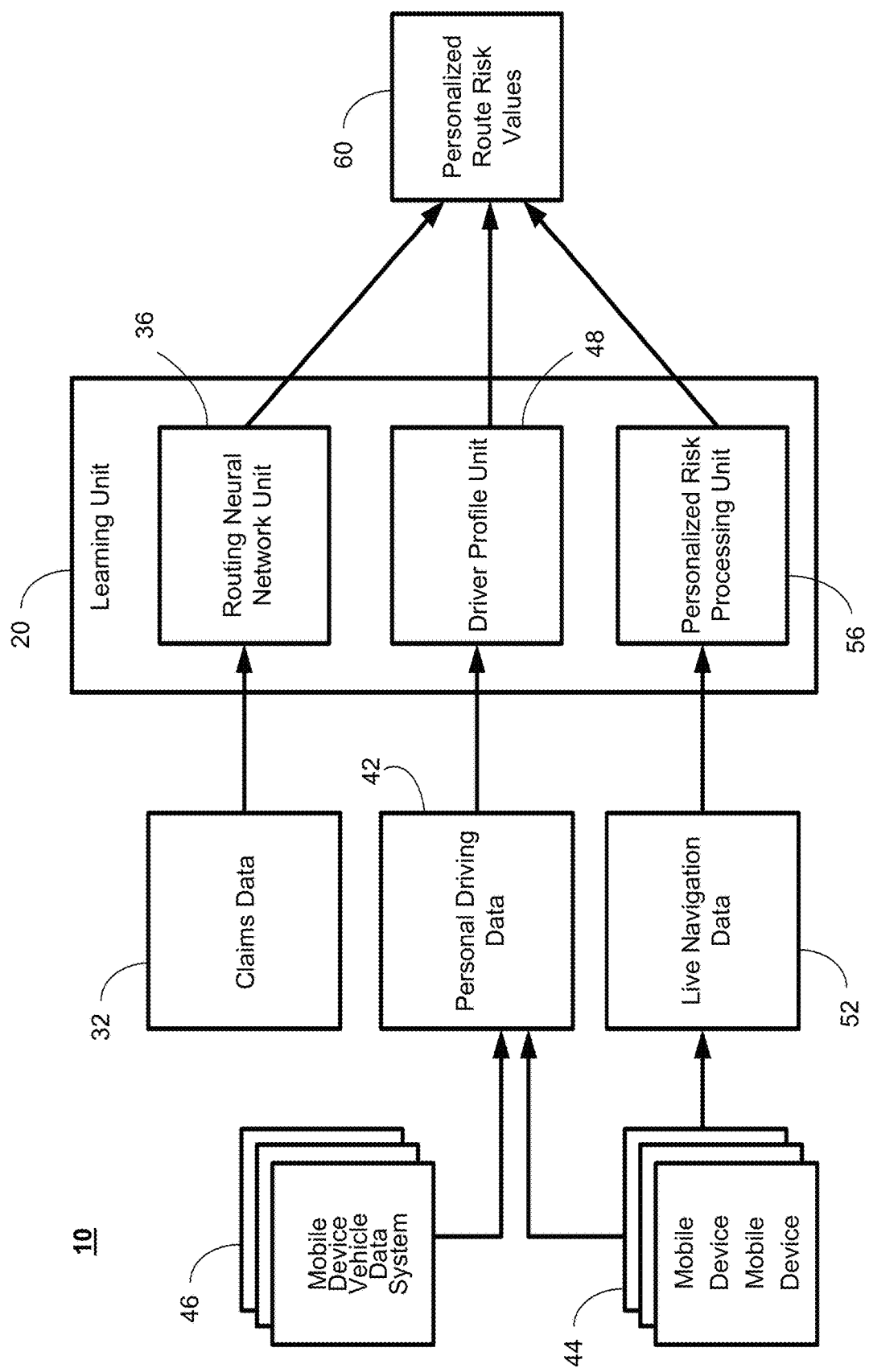
FIG. 1 is a data flow diagram showing example techniques for determining driving risk, in accordance with some embodiments.

The present embodiments may relate to, inter alia, systems and methods for generating personalized risk values associated with driving routes, and selecting safest routes for drivers based at least in part upon the personalized risk values.

A supervised machine learning model may be trained to identify road types, road conditions, and/or driving behaviors that are predictive of insurance claim frequency and/or severity (e.g., correlating to increased damage to property and/or injury to persons). Road types and/or conditions predictive of claim frequency and/or severity may be identified via segmentation and analysis of various segments of road, including for example straightaways, curves, intersections, unprotected left turns, uphill or downhill segments, passing-permitted segments, no-passing segments, segments having a particular speed limit, animal crossing areas, school zones, etc.

A "road type" may include, for example, uphill road segments, unprotected left turns, highways, curves, high-speed areas, passing areas, and/or other features of roads, including combinations thereof. A "road condition" may include, for example, damage or deterioration of a road (e.g., pothole, bump, etc.), a weather or climate condition (e.g., fog, heat, rain, ice, snow, etc.), a visibility condition (e.g., poor sight further along the road), etc. Driving behaviors that correlate to claim frequency and/or severity may include, for example, speeding, distracted driving, tailgating, etc.

In embodiments described herein, the machine learning model may be trained based at least in part upon sample insurance claims data indicative of vehicle collisions and/or other vehicle-related incidents. For any given incident, the claims data may include data indicative of the severity of the incident (e.g., degree of injury to persons, cost of care as a result of injury, cost of damage to vehicles or other public or private property, etc.). Further, the claims data for a given incident may indicate where the incident occurred, as well as road conditions at the time of the incident. Still further, in some embodiments, the claims data may include vehicle telematics data indicative of behavior of vehicles at the time of the given incident (e.g., vehicle speed/acceleration leading up to a vehicle collision).

The machine learning model, once trained, may be applied to determine a level of risk associated with any particular road segment, based at least in part upon how the particular road segments (and/or similar road segments) correlate to claim frequency and/or claim severity (the "training data"). Specifically, the trained machine learning model may determine a "base risk value" associated with the particular road segment, e.g., an evaluation of risk that is independent of any particular driver.

Additionally, personalized driver profiles may be generated, each driver profile corresponding to a particular driver. Specifically, the generated driver profile for a particular driver may be created based at least in part upon personal driving data associated with the particular driver (e.g., vehicle telematics data, vehicle maintenance data, and/or past insurance claim data). Personal driving data for the particular driver may be received, for example, via one or more mobile devices and/or one or more vehicle data systems associated with the particular driver (and/or associated with other similar drivers). The personalized driver profile may, once generated, indicate a likelihood of the particular driver to experience increased or decreased risk on particular road types, or in particular road conditions, based at least in part upon driving behaviors shown by the particular driver (e.g., more risk at sharp curves due to the driver's speeding habits).

For any given driving route sought by a particular driver, the trained machine learning model may be applied to determine a personalized risk value for the route. Particularly, in embodiments describe herein, the trained machine learning model may determine base risk values associated with each road segment included in the route, and/or a base risk value for the entirety of the route. A driver profile corresponding to the particular driver may be applied to the machine learning model to personalize the risk values associated with the road segments included in the route, and/or for the route as a whole (e.g., sum or average of risk values associated with the segments), thereby creating a personalized risk value for the route.

In some embodiments, systems and methods described herein may determine, for any particular origin and destination, two or more possible driving routes from the origin to the destination. For each route from the two or more routes, a personalized risk value may be determined, and a safest route from the two or more routes may be selected based at least in part upon the personalized risk values. An indication of the safest route may be provided to the driver, to thereby facilitate personalized safe navigation from the origin to the destination. Furthermore, insurance discounts may be provided to those drivers who reduce their driving risk by following the safe routes determined via the techniques described herein.

In some embodiments, personalized risk values for each route may be weighted based at least in part upon an estimated travel time and/or distance between the origin and destination for each respective route. Thus, a safe route from the origin and destination may be identified with consideration of convenience in terms of travel time and distance.

In embodiments described herein, a trained machine learning model may include one or more artificial neural networks. However, it should be appreciated the systems and methods described herein, unless stated otherwise, are not limited to using an artificial neural network. The systems and methods described herein may utilize additional and/or alternative types of supervised machine learning models, such as a regression analysis, a k-nearest neighbors algorithm, a naïve Bayes model, a support-vector machine, a decision tree, or suitable combinations of the above. In any case, training data used to train the machine learning model may include insurance claims data indicative of claim frequency and/or claim severity, as described herein.

Example Data Flow Diagram for Determining Risk Values

FIG. 1 is a data flow diagram 10 showing example techniques for determining personalized risk values associated with driving routes ("personalized route risk values"). Particularly, the determination of personalized route risk values may be achieved via a learning unit 20 configured to train a machine learning model based at least in part upon training data described herein. Transmission of data described herein may be performed, for example, via various wired and/or wireless communications over one or more communications networks (e.g., cellular communications, Wi-Fi, satellite communications, etc.).

Insurance claims data 32 may be obtained, for example, via a database of an insurance company and/or other data sources. Generally, the claims data 32 may be associated with vehicle collisions and/or other vehicle-related incidents for which insurance claims were made. Claims data may include data indicative date, time, and location of respective collisions or other vehicle-related incidents to which the claims are directed. Typically, the data for any particular insurance claim includes data indicative of severity of the particular claim (e.g., via data indicative of injury to persons, cost of damage to public or private property including vehicles, etc.). In some cases, data for a particular insurance claim includes vehicle telematics data indicative of driving behaviors of one or more vehicles at the time of the incident (e.g., speeding, acceleration, proximity to other vehicles, indications of distracted driving such as texting, etc.).

The claims data 32 may be provided to the learning unit 20. Particularly, the claims data 32 is received by a route modeling unit 36 of the learning unit 20. The route modeling unit 36 may include software that is configured to receive the claims data 32 and use the claims data 32 as "training data" to identify road types, road conditions, and/or driving behaviors indicated therein that correlate to claim frequency and/or claim severity, and hence risk (thereby training the machine learning model). In various embodiments, the machine learning model may use road data to "segment" given roads into particular road segments, to thereby facilitate evaluation of claim frequency/severity associated with respect each particular road segment. The machine learning model may segment the road, for example, based at least in part upon particular features, particular lengths of road (e.g., 0.1 miles, 0.25 miles, 1 mile, 2 miles, etc.), and/or based at least in part upon particular time-wise lengths of road (e.g., 5 seconds of driving at posted speed limits, 10 seconds, 30 seconds, 1 minute, etc.).

The machine learning model may include any suitable type(s) of supervised machine learning models. In embodiments described herein, the machine learning model may include an artificial neural network, such as a recurrent neural network or a feed-forward neural network. Such an artificial neural network may comprise a plurality of nodes, also referred to herein as "neurons," arranged in a plurality of layers, and each neuron may process one or more inputs to generate one or more outputs (e.g., a decision or another value). Example neural networks and the elements thereof will be discussed further herein, in particular with regard to FIGS. 4 and 5. Additional and/or alternative types of supervised machine learning models may be used, in various embodiments, (e.g., a regression analysis, a k-nearest neighbors algorithm, a naïve Bayes model, a support-vector machine, and/or a decision tree).

In any case, the route modeling unit 36 trains the machine learning model to generate "correct" outputs (e.g., within a margin of error) indicating risk associated with a given road segment (e.g., the given road segment generally, and/or under particular road conditions or driving behaviors). Once the machine learning model is trained, a given road segment (and/or conditions or driving behaviors associated therewith) can be fed to the trained machine learning model to determine a "base risk value" associated with the given road segment, based at least in part upon whether the given road segment is associated with road types or road conditions found to affect claim frequency or severity (and hence, risk). The base risk value of a given road segment may, for example, indicate an expected cost of loss associated with one driver driving across the given road segment (a "cost-per-operation").

Furthermore, personal driving data 42 may be obtained by the learning unit 20. The personal driving data 42 generally includes data associated with driving behaviors of respective drivers (e.g., vehicle telematics data including speeding, acceleration, proximity to other vehicles, indications of distracted driving such as texting while driving, etc.). Personal driving data 42 may, for example, be obtained from mobile devices 44 and/or vehicle data systems 46 of respective drivers upon express permission to obtain personal driving data from the respective drivers.

The personal driving data 42 is provided to a driver profile unit 48 of the learning unit 20. The driver profile unit 48 may generate a personalized driver profile for any particular driver, the driver profile generally indicating driving habits of the particular driver. Driving habits may include, for example, tendency of the driver to speed, accelerate, brake, turn, text, etc. In some embodiments, driving habits for a particular driver may more specifically be associated with particular road types and/or conditions (e.g., tendency to drive carefully by slowing down when driving on snowy roads, tendency to tailgate in bumper-to-bumper traffic, tendency to speed or accelerate around sharp curves, etc.).

While a particular driver is driving, live navigation data 52 may be obtained, for example from a mobile device 44 of the particular driver and/or from a vehicle data system 46 of the particular driver. Live navigation data 52 may include, for example, location and/or navigation data indicating one or more potential driving routes between an origin and a destination desired by the driver. The one or more routes may be generated, for example, via a mapping/routing software application executing at the mobile device 44 and/or at the vehicle data system 46. In any case, the live navigation data 52 is provided to a personalized risk processing unit 56 of the learning unit 20.

The personalized risk processing unit 56 determines, for each received route, a set of road segments included in the route (e.g., one, two, three, or more road segments). The learning unit 20 uses the capabilities of the route modeling unit 36, driver profile unit 48, and personalized risk processing unit 56 to determine personalized route risk values 60, each personalized route risk value being tailored to the particular route and particular driver.

Particularly, for any particular route, the personalized risk processing unit 56 determines a base risk value associated with the particular route. Generally, the base risk of the route is based at least in part upon the base risk values of each of the road segments included in the route (e.g., a sum, median average, mean average, or weighted mean average of the base risk values of each road segment in the route). Accordingly, the base risk value associated with the particular route may, for example, correspond to an expected loss per driver driving the particular route (a base "cost-per-route").

In some embodiments, the personalized risk processing unit 56 may modify the base route risk value (or, the base road segment risk value(s)) based at least in part upon a driver profile corresponding to the particular driver. Additionally or alternatively, in some embodiments, the personalized risk processing input 56 generates one or more inputs to be fed to the trained machine learning model, based at least in part upon the driver profile of the particular driver (e.g., an input indicative of speeding, where the driver profile indicates that the driver is likely to be speeding on a given road). In any case, the application of the driving profile to the machine learning model (e.g., to inputs and/or outputs thereof) may produce personalized risk values 60 associated with segments/routes. In some embodiments, the personalized route risk values 60 take into account live conditions on the route or on particular segments thereof (e.g., live weather conditions and/or weather patterns). Traffic and/or weather data may be obtained, for example, by the personalized risk processing unit 56 via mobile devices 44 and/or vehicle data systems 46.

In any case, the personalized route risk values 60 may be used to determine, from any two or more possible routes between an origin and destination, the safer or safest of the two or more possible routes for a particular driver. For any two routes, whereas the first of the two routes may be the safer route for a first driver (e.g., based at least in part upon the first driver's observed driving behaviors as indicated by a first driver profile), the second of the two routes may actually be the safer route for a second driver (e.g., based at least in part upon the second driver's observed driving behaviors as indicated by a second driver profile). In various embodiments, as will be described herein, indications of personalized route risk values 60 are provided to drivers to facilitate safe driving.

The data flow diagram 10 may include additional, fewer, and/or alternate elements, in some embodiments. Furthermore, where appropriate, two or more of the elements of the data flow diagram may be combined.

Example Computing Environment

Figure 2:
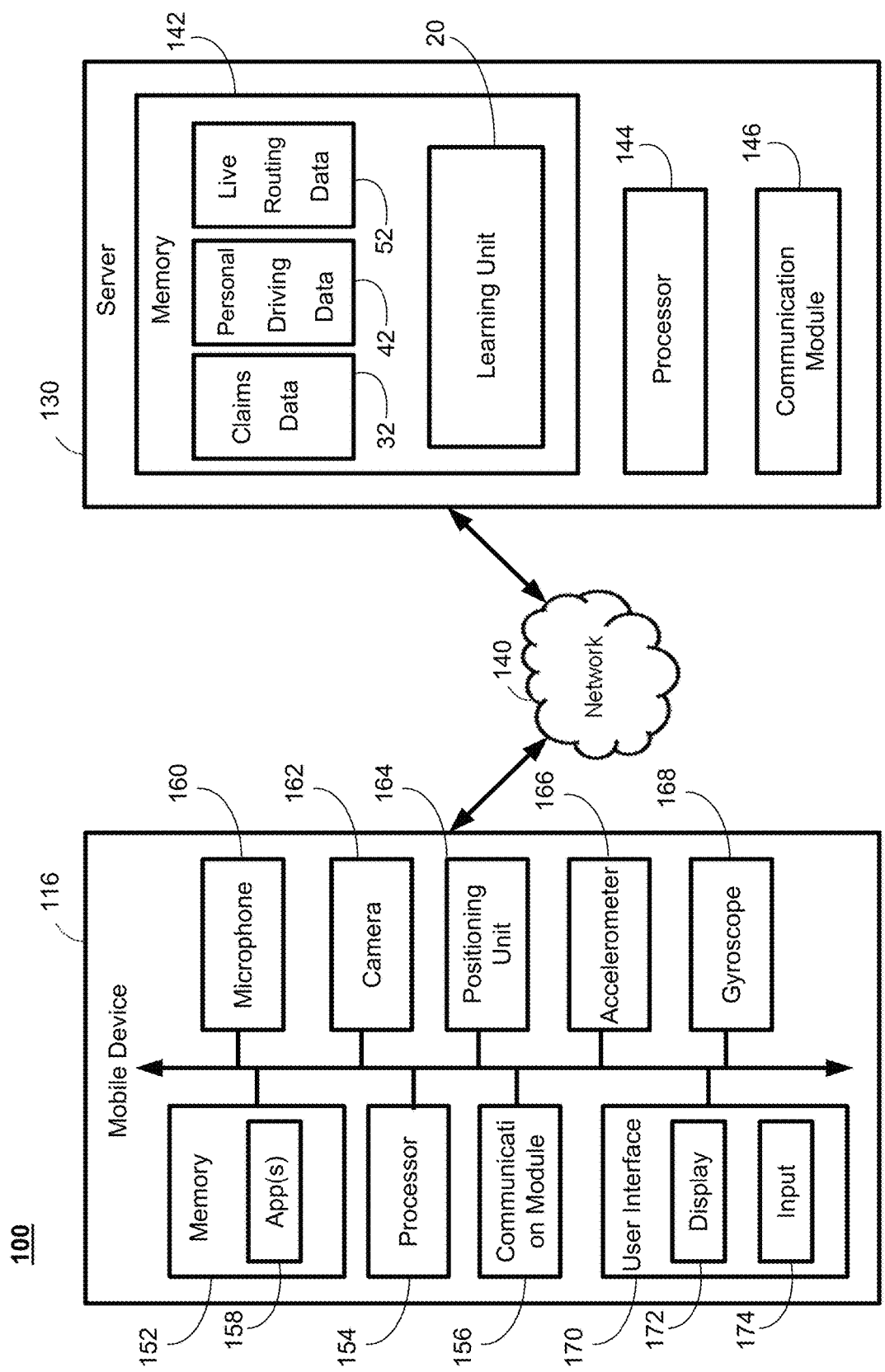
FIG. 2 depicts a block diagram showing an example computing environment in which the techniques of FIG. 1 may be implemented, in accordance with some embodiments.

FIG. 2 depicts an environment 100 in which at least some of the techniques of FIG. 1 may be implemented, in accordance with some embodiments. The environment 100 generally includes a mobile computing device 116 ("mobile device," e.g., a smartphone) communicatively coupled to a server 130 via a network 140. The mobile device 116 may correspond to one or more mobile devices 44 of FIG. 1. While one mobile device 116 is illustrated in FIG. 2, it should be understood that a plurality of mobile devices 116 may be envisioned, and each mobile device may correspond to a respective vehicle driver. Furthermore, where the mobile device 116 is described, a vehicle data system may be envisioned, in alternate embodiments (e.g., vehicle data system 46 of FIG. 1). Furthermore, in still other embodiments, other computing devices may be possible (e.g., a desktop computer).

The mobile device 116 and the server 130 may communicate via the network 140 (e.g., one or more networks). The network 140 may include one or more wired and/or wireless local area networks (LANs), and/or one or more wired and/or wireless wide area networks (WANs) such as the Internet or a cellular communications network.

While the server 130 is referred to in the singular, the server 130 may include one or more distinct servers (e.g., distributed servers of a backend server farm). The server 130 includes a memory 142 (e.g., one or more memories). The memory 142 may include ROM, RAM, and/or other types of computer memory, and may include computer-executable instructions to be executed via a processor (e.g., one or more processors) 144. Generally, the computer-executable instructions, when executed via the processor 144, may cause the server 130 to receive or obtain, via a communication module 146, various forms of data described herein. Data received by the server 130 may include, for example, the claims data 32, personal driving data 42, and/or live navigation data 52.

In some embodiments, the server 130 obtains claims data 32, personal driving data 42, and/or live navigation data 52 from the mobile device 116 via the network 140. For example, the mobile device 116 of a particular driver may be configured to obtain insurance claims data associated with the particular driver, and may further be configured to transmit the claims data to the server 130. Additionally or alternatively, the mobile device 116 may be configured to obtain personal driving data of the particular driver (e.g., vehicle telematics data), and transmit the personal driving data to the server 130. Still additionally or alternatively, the mobile device 116 may be configured to obtain live navigation data for the particular driver (e.g., real-time requests for navigation and/or indications of generated navigation routes, for example from a navigation application). The mobile device 116 may transmit the live navigation data to the server 130 via the network 140. In any case, data obtained or received by the server 130 from the mobile device 116 may be stored at the memory 142.

The memory 142 may further include the learning unit 20, which may be implemented as a software module, for example. As discussed above, the learning unit may be configured to (1) train a machine learning model to determine risk associated with routes and road segments, based at least in part upon road types, conditions, and/or driving behaviors that are predictive of claim frequency and/or severity, (2) generate personalized driver profiles corresponding to respective drivers, and/or (3) apply the trained machine learning model and the driver profile(s) to live navigation data to determine personalized route risk values for each of one or more routes.

The mobile device 116 may include a memory (e.g., one or more memories) 152. The memory 152 may include a ROM, RAM, and/or other computer memories. The memory 152 may include computer-executable instructions that, when executed via a processor 154 (e.g., one or more processors), cause the mobile device 116 to obtain claims data, personal driving data, and/or live navigation data corresponding to a user of the mobile device 116 (e.g., a driver). The mobile device 116 may transmit the obtained data via the network 140 to the server 130, for example via the processor 154 and/or a communication module 156 (e.g., one or more communication modules).

The computer-executable instructions may, in some embodiments, be included within one or more software applications 158 ("App(s)") configured specifically to perform certain actions described herein. Such one or more applications may, in various embodiments, be configured to obtain data from components of the mobile device 116 including a microphone 160, a camera 162, a positioning unit 164 (e.g., GPS unit), an accelerometer 166, a gyroscope 168, and/or a user interface 170 (e.g., an interactive touchscreen display of the mobile device 116). The user interface 170 may include a display 172 (e.g., one or more display devices, e.g., a visual display screen), and/or an input 174 (e.g., one or more input devices, e.g., a touchscreen, keypad, etc.).

In some embodiments, the user of the mobile device 116 may utilize the user interface 170 to expressly "opt-in" to data collection functionalities of the one or more applications 158. An "opt-in" may include, for example, (1) a user acceptance of the use of personal claims data (or particular portions thereof) to train the machine learning model, (2) a user acceptance of the use of past, present, and/or future vehicle telematics data to create a personalized driver profile of the user, and/or (3) a user acceptance of the use of live navigation data of the mobile device 116 to determine risk values and safest routes using the trained machine learning model and/or personalized driver profile.

In accordance with the above, one or more applications 158 may include, for example, an insurance application configured to receive, manage, view, and/or transmit information pertaining to vehicle insurance claims. Additionally or alternatively, the one or more applications 158 may include a vehicle telematics application configured to obtain telematics data corresponding to the user's vehicle during one or more driving sessions. Still additionally or alternatively, the one or more applications 158 may include a navigation application configured to generate driving routes between a given origin and destination. A navigation application may, for example, include an existing navigation application, with which functionalities of the machine learning model described herein may be integrated (e.g., to add safe routing functionalities to an existing navigation application operating at the mobile device 116).

In some embodiments, at least some functions or components of the learning unit 20 may be disposed at the mobile device 116. For example, at least a portion of the personalized risk processing unit 56 of FIG. 1 may be disposed at the mobile device 116. Additionally or alternatively, in some embodiments, at least a portion of the training of the machine learning model described herein may be performed by the mobile device 116.

Additional, fewer, or alternate components of the environment 100, and/or additional, fewer, or alternate actions thereof, may be envisioned, in some embodiments.

Example Routes and Road Segments

Figure 3A:
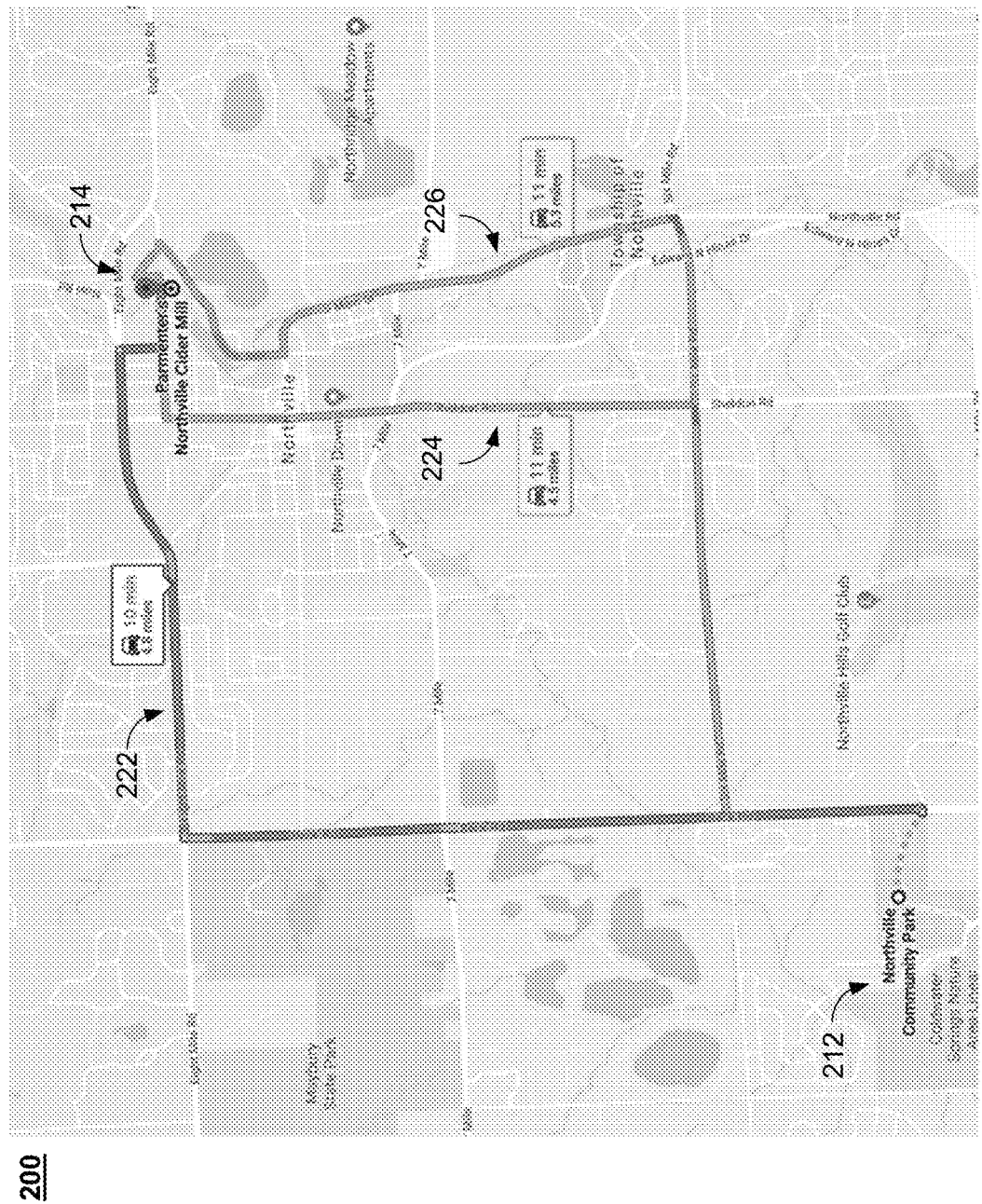
FIGS. 3A and 3B depict example a plurality of possible routes between an origin and a destination, in accordance with some embodiments.
Figure 3B:
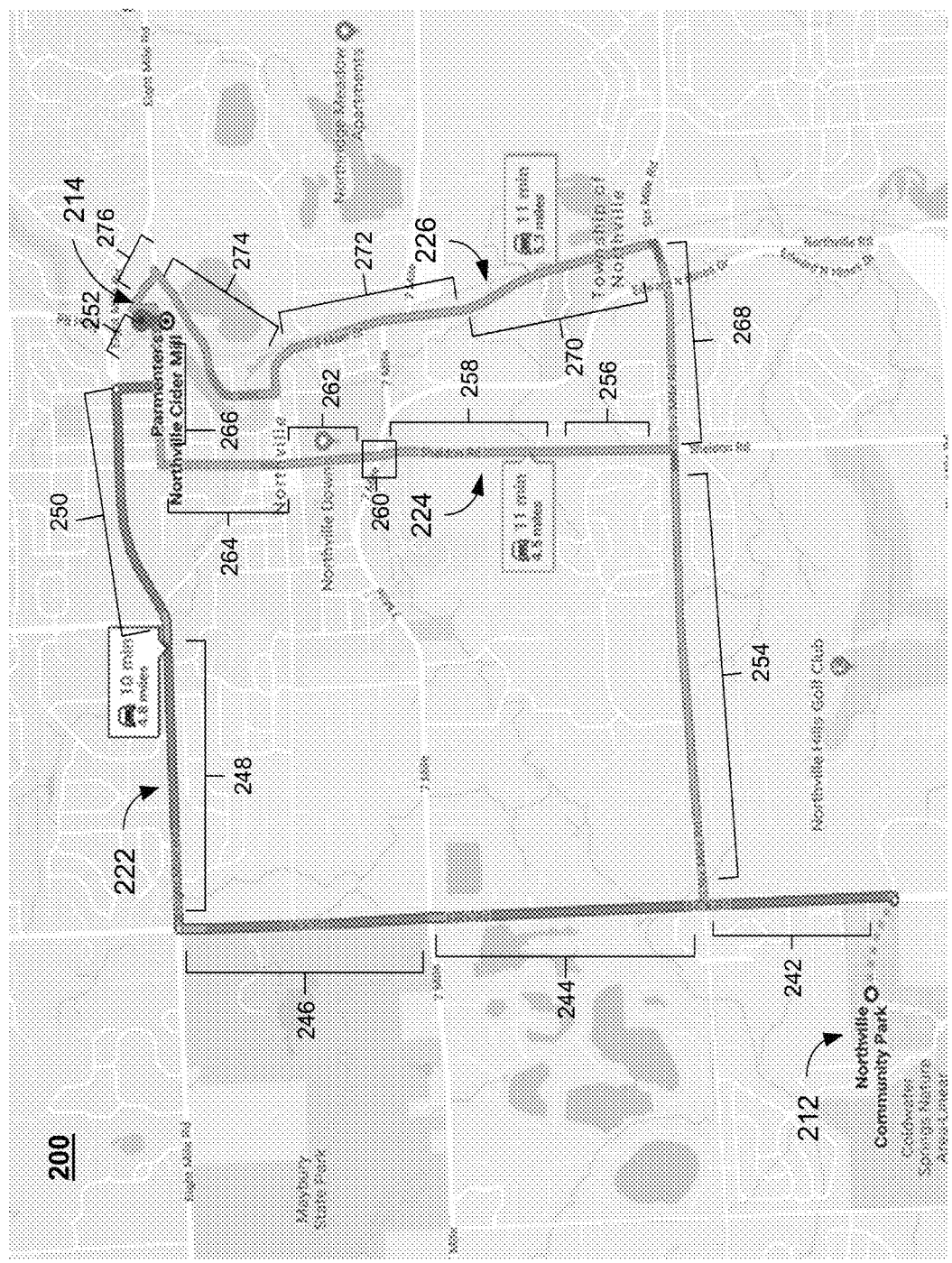

FIGS. 3A and 3B depict example navigation techniques and route segmentation techniques, in accordance with some embodiments. Particularly, each of FIGS. 3A and 3B depicts a map 200 that may be displayed, for example, via a navigation application executing at a mobile computing device (e.g., mobile device 44 and/or 116 of FIGS. 1 and 2, respectively), and/or at a vehicle data system of a vehicle (e.g., vehicle data system 46 of FIG. 1).

First referring to FIG. 3A, the map 200 provides driving routes from an origin 212 (bottom-left) to a destination 214 (top-right). In accordance with techniques of existing navigation applications, three possible driving routes have been generated between the origin 212 and destination 214, where the user can select and receive navigation according to any one of the generated routes. The generated routes include a first route 222, a second route 224, and a third route 226.

As will be described herein, respective risk values may be determined for each of the routes 222, 224, and 226, and the respective risk values may be used to recommend a safest one of the routes 222, 224, and 226. In some embodiments, the generating of the routes 222, 224, and 226 is performed by the navigation application executing at the mobile computing device. That is, routes may be generated by existing navigation applications or other means, and the pre-generated routes may be provided to one or more servers configured to determine risk values associated as described herein. Techniques of this disclosure may thereby be integrated into existing navigation software. In certain embodiments, the one or more servers configured to determine risk values may be further configured to perform the generating of the routes (e.g., to perform or replace at least some functionalities of a navigation application).

In any case, as can be observed from FIG. 1, each of the routes 222, 224, and 226 may be associated with an estimated distance and/or an estimated travel time (e.g., based at least in part upon posted speed limits and/or live traffic conditions). Existing navigation applications typically recommend the route with the shortest travel time (e.g., the fastest route, which in this case the route 222). In certain examples, some existing applications recommend the route with the shortest distance (which in this case is the route 224). Existing navigation applications may display the alternate routes which were not selected (in this case, routes 224 and 226), and the driver may interact with the navigation application to select one of the alternate routes instead of the recommended route. In any case, selection of a route typically causes the navigation application to provide location monitoring and driving instructions to guide the driver along the route to the destination 214.

Techniques of the present disclosure may include "segmenting" any particular driving route. That is, a driving route is separated into two or more road segments. FIG. 3B depicts the map 200 of FIG. 3A, and further denotes road segments making up the routes 222, 224, and 226. Although indicators of the road segments are provided in FIG. 3B for ease of description herein, it should be understood that indicators of road segments may not be displayed via the navigation application executing at the mobile computing device.

Referring to FIG. 3B, each of the routes 222, 224, and 226 includes a respective plurality of road segments. Specifically, the route 222 includes road segments 242, 244, 246, 248, 250, and 252. The route 224 includes road segments 242, 254, 256, 258, 260, 262, 264, and 266. Finally, the route 226 includes road segments 242, 254, 268, 270, 272, 275, and 276. Thus, an entirety of any given route can be defined via a plurality of road segments, and certain road segments may be shared by two or more routes.

Various techniques, including combinations thereof, may be used to define the road segments. In some embodiments, a road segment is delineated based at least in part upon distance (e.g., each road segment is to have a length of approximately 0.5 miles, or road segments are defined such that no segment has a length of greater than 1 mile or less than 0.25 miles). In some embodiments, a road segment is delineated based at least in part upon a time rule based at least in part upon estimated driving time across the road segment (e.g., each road segment is to correspond to approximately 20 seconds of driving, or road segments are defined such that no segment is longer than 1 minute or shorter than 5 seconds). Still additionally or alternatively, in some embodiments, road segments are delineated based at least in part upon particular road features or hazards present within the respective road segments. Features based at least in part upon which road segments may be delineated may include straightaways, curves, intersections, high-traffic areas, passing areas, high-speed areas, animal collision risks, potholes, and/or other road types or road conditions described herein. As an example, a first road segment may include a curve leading up to an intersection, a second road segment may include the intersection, and the third road segment may include a road following the intersection.

In various embodiments, road segments may be defined before, after, and/or concurrently to the generation of routes. For example, in some embodiments, road segments are defined a priori independently of routes, and thus any given route can be mapped to a plurality of pre-existing road segments. In other embodiments, road segments are defined upon generation of a route. That is, the route is generated and, based at least in part upon the generated route, a new plurality of road segments are formed therein (e.g., each new road segment corresponds to 1% of the generated route, 5%, 10%, etc.).

In any case, via the techniques of this detailed description, respective risk values may be determined for each particular road segment in a particular route. Based at least in part upon risk values for the plurality of road segments defining the particular route, a risk value for the particular route may be determined. In embodiments described herein, risk values of road segments and/or routes are personalized to particular drivers based at least in part upon driver profiles corresponding to the particular drivers. Thus, from two or more possible routes between a given origin and destination, a safest route for a particular driver may be determined, and the route may be recommended and/or selected for the use to facilitate safe navigation. In the following sections of this detailed description with respect to FIGS. 4 and 5, techniques are provided for training a machine learning model (particularly, an example artificial neural network) for determining personalized risk values and selecting safe routes for drivers.

Example Elements of an Artificial Neural Network

Figure 4:
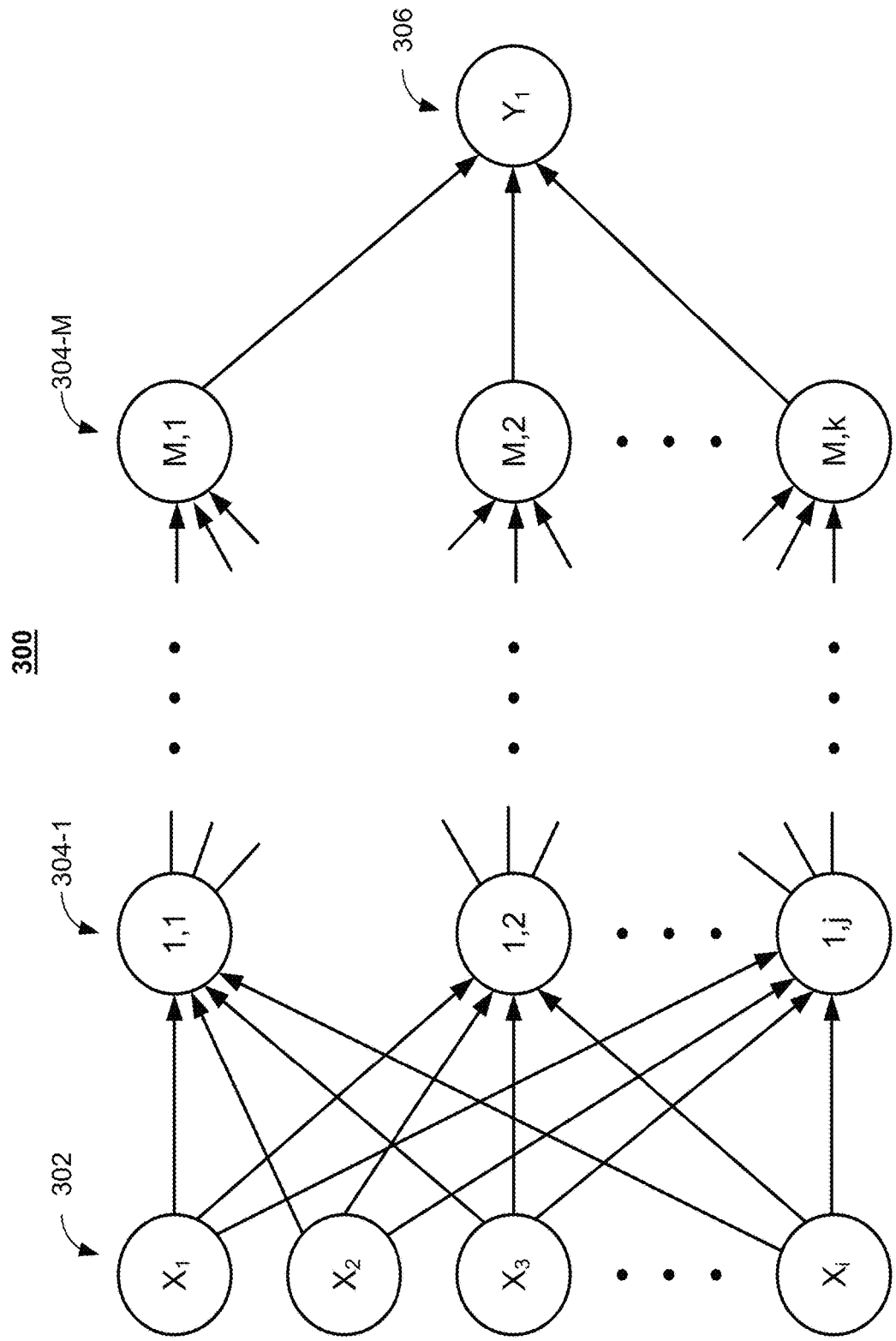
FIG. 4 depicts an example machine learning model in the form of an artificial neural network that may be trained to determine driving risk associated with road segments and routes, in accordance with some embodiments.

FIG. 4 depicts elements of an example artificial neural network 300 that may be trained to predict risk associated with driving routes and road segments included therein. The neural network 300 may be trained, for example, by the learning unit 20 of FIG. 1, or more specifically, the route modeling unit 36 of the learning unit 20. The neural network 300, once trained, may be utilized, for example, by the personalized risk processing unit 56 and/or the driver profile unit 48 of the learning unit 20.

The neural network 300 includes a multiplicity of neurons arranged in multiple layers, and includes an input layer 302, one or more intermediate layers 304-1 through 304-M ("hidden layer(s)"), and an output layer 306. M may be any integer greater than or equal to one. Each of the layers 302, 304-1 through 304-M, and 306 may have any number of inputs/neurons/outputs (e.g., the layer 304-1 including neurons "1, 1" through "1, j," wherein j represents the number of neurons in layer 304-1). Each layer may have same or different numbers of inputs/neurons/outputs. Various other configurations of the neural network 300 are possible.

Inputs included in the input layer 302 may correspond to insurance claims data that may be obtained or derived from mobile computing devices (e.g., mobile device 44 and/or 116), vehicle data systems (e.g., vehicle data system 46), and/or other data sources (e.g., a claims data server). For example, each input $x_1$ through $x_i$ of the input layer 302 (wherein i represents the number of inputs) may include one or more metrics associated with an insurance claim associated with a vehicle-related incident (e.g., a single-vehicle or multi-vehicle collision). The vehicle-related incident may be associated with a known risk value (e.g., a single composite value accounting for severity of injury to persons, damage to vehicles, damage to other public or private property, etc., as indicated by the claims data).

Metrics used as inputs may include, for example, (1) location/condition data associated with the incident (e.g., a road or segment thereof on which the incident occurred, weather or traffic conditions at the time of the incident, etc.), (2) vehicle telematics data associated with the incident (e.g., driving behavior of the vehicle at fault or otherwise involved in the incident), and/or (3) other information associated with the involved vehicle(s), e.g., vehicle make and model, vehicle maintenance data, etc.).

In some embodiments, the number of inputs used by the neural network 300 during training may be greater than the number of inputs used by the neural network 300 after training. For example, some inputs associated with vehicle-related incidents may be found to not be predictive of claim frequency/severity, and thus those inputs are not used in the trained neural network 300.

Each of the intermediate layers 304-1 through 304-M may include any number of neurons, and a different number of neurons at each layer is possible. Each intermediate layer neuron may operate on one or more inputs from the input layer 302 and/or one or more outputs of other layers (e.g., a preceding intermediate layer), to generate a decision or other output.

The output layer 306 may include an output $y_1$ or, in some cases, more than one output. Particularly, the output $y_1$ may correspond to a risk value with the corresponding input(s) $x_1$ through $x_i$. In some embodiments, determining the output $y_1$ may include normalizing the output $y_1$ to a value from 0 to 1 (lowest risk to highest risk, respectively). Additionally, in some embodiments, an output of the neural network 300 may be obtained not just from the output layer 306, but also from one or more of the intermediate layers 304-1 through 304-M.

In some embodiments, the neural network 300 may be a recurrent neural network, wherein decisions or outputs from at least one layer of the neural network 300 are fed back to at least one previous layer during training to provide an indication of significance (e.g., a "weight") of a particular input or intermediate layer output in determining a particular decision or calculation. For example, outputs of an intermediate layer 304 and/or output layer 306 may be utilized to weight input metrics at the input layer 302. As a result of training, in some embodiments, insignificant inputs of inputs 302, and/or insignificant neurons of layers 304-1 through 304-M, may be bypassed in order to reduce processing demands in predicting a risk value.

Effectively, the output $y_1$ may be utilized as a representation of risk associated with a particular driving scenario defined by the inputs $x_1$ through $x_i$. For example, the input $x_1$ through $x_i$ at least partially define a driving scenario associated with a particular one or more road segments (e.g., a 0.1 mile or 15 second interval of driving), a weather condition (e.g., light rain), a traffic condition, a vehicle type, etc. The artificial neural network 300 is trained to operate upon the inputs $x_1$ through $x_i$ to compute a correct risk value associated with the inputs, where the risk value reflects (1) the likelihood of a vehicle-related incident to occur in that driving scenario ("frequency"), and (2) the severity of those vehicle-related incidents when those incidents occur ("severity").

In embodiments herein in which the machine learning model includes an artificial neural network, a personalized driver profile of the particular driver may be provided to the artificial neural network to determine a personalized risk value for a route (and/or personalized risk values for one or more segments included therein). In some embodiments, applying the driver profile to the neural network includes modifying weights associated with particular inputs/neurons/outputs, based at least in part upon the personalized driver profile. As an example, when the personalized driver profile indicates that the driver tends to handle sharp curves at high speeds, higher weights in portions of the neural network associated with risk related to curves, corners, etc. Additionally or alternatively, in some embodiments, inputs to the neural network 300 are added, removed, and/or modified based at least in part upon the personalized driver profile. For example, base inputs provided to the neural network 300 may set forth a driving scenario corresponding to a particular road segment (e.g., a sharp curve, in rain, having a posted speed limit of 35 mph). Based at least in part upon the personalized driver profile, a "high speed" input may be added to the inputs, the added input being based at least in part upon the driver profile indicating that the driver is likely to exceed speed limits generally, or in that specific scenario. Via adjustments to weights, inputs, outputs, and/or neurons of the neural network 300, the ultimate output of the neural network 300 is affected in a manner that accounts for the personalized driver profile (e.g., driving behaviors) of the particular driver.

Figure 5:
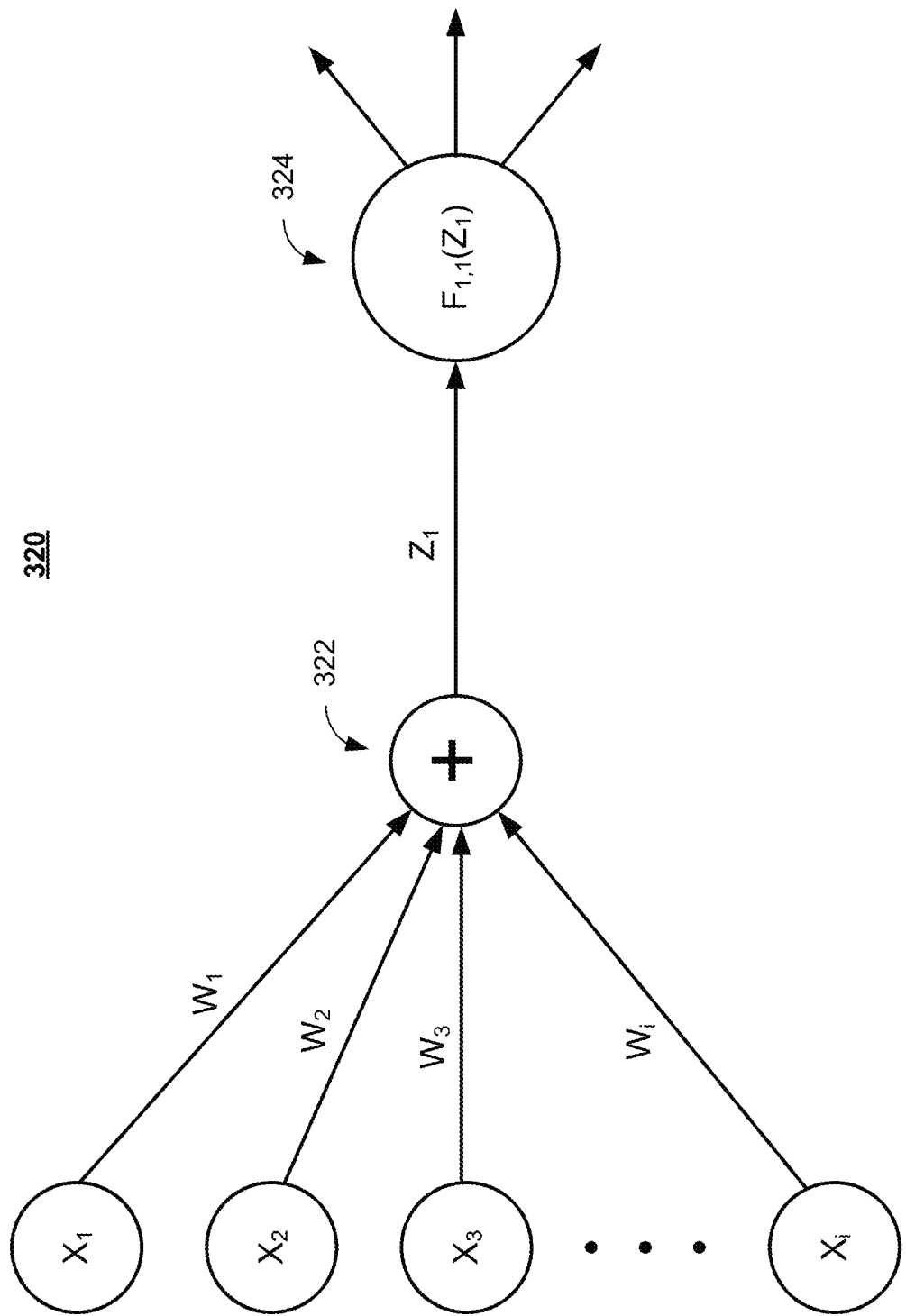
FIG. 5 depicts an example artificial neural network neuron that may be included in the artificial neural network of FIG. 4, in accordance with some embodiments.

FIG. 5 depicts an example neuron 320 that may correspond to a particular neuron of the neural network 300 of FIG. 4 (e.g., a neuron "1, 1" of the layer 304-1). At least one of inputs $x_1$ through $x_i$ may be provided to the neuron 320. A particular input may be, for example, an input to the neural network 300 itself as described with respect to FIG. 4, or an output of a neuron of another layer of the neural network 300. Each input may be assigned a respective weight ($W_1$ through $W_i$), wherein the weight of each input may be determined during the process of training the neural network 300. In some cases, an input may be determined to be insignificant to a decision or calculation of a neuron, and may accordingly be assigned a zero or near-zero weight.

The weighted inputs $x_1$ through $x_i$ may be provided to a summing node 322 of the neuron 320. A sum of the weighted inputs, $z_1$, may be provided as an input to a function 324, labeled in FIG. 5 as $F_{1,1}(z_1)$. The function 324 may represent any suitable linear or non-linear operation on $z_1$. As shown in FIG. 5, an output of function 324 may be provided to a number of neurons of the next layer, and/or may be provided as an output of neural network 300.

In other embodiments, and/or in other training scenarios, the neuron 320 may be arranged differently than is shown in FIG. 5. For example, the summing node 322 may be omitted, and the function 324 may operate directly on one or more of the inputs $x_1$ through $x_i$. As another example, the neuron 320 may not apply weights to any of the inputs $x_1$ through $x_i$ (e.g., equal weight may be applied to all inputs).

Examples of Selecting Routes Based at Least in Part Upon Personalized Risk

A machine learning model as described herein (e.g., including an artificial neural network) may be applied to any particular driving route (e.g., to a plurality of road segments therein) to determine a personalized risk value associated with the particular driving route. Thus, given two or more possible routes between a same origin and destination, a safest route for a particular driver may be selected from among the two or more routes. Often, even if the safest route is neither the fastest route nor the shortest route, the driver may willingly extend their route upon discovering that doing so will significantly mitigate risk.

Figure 6:
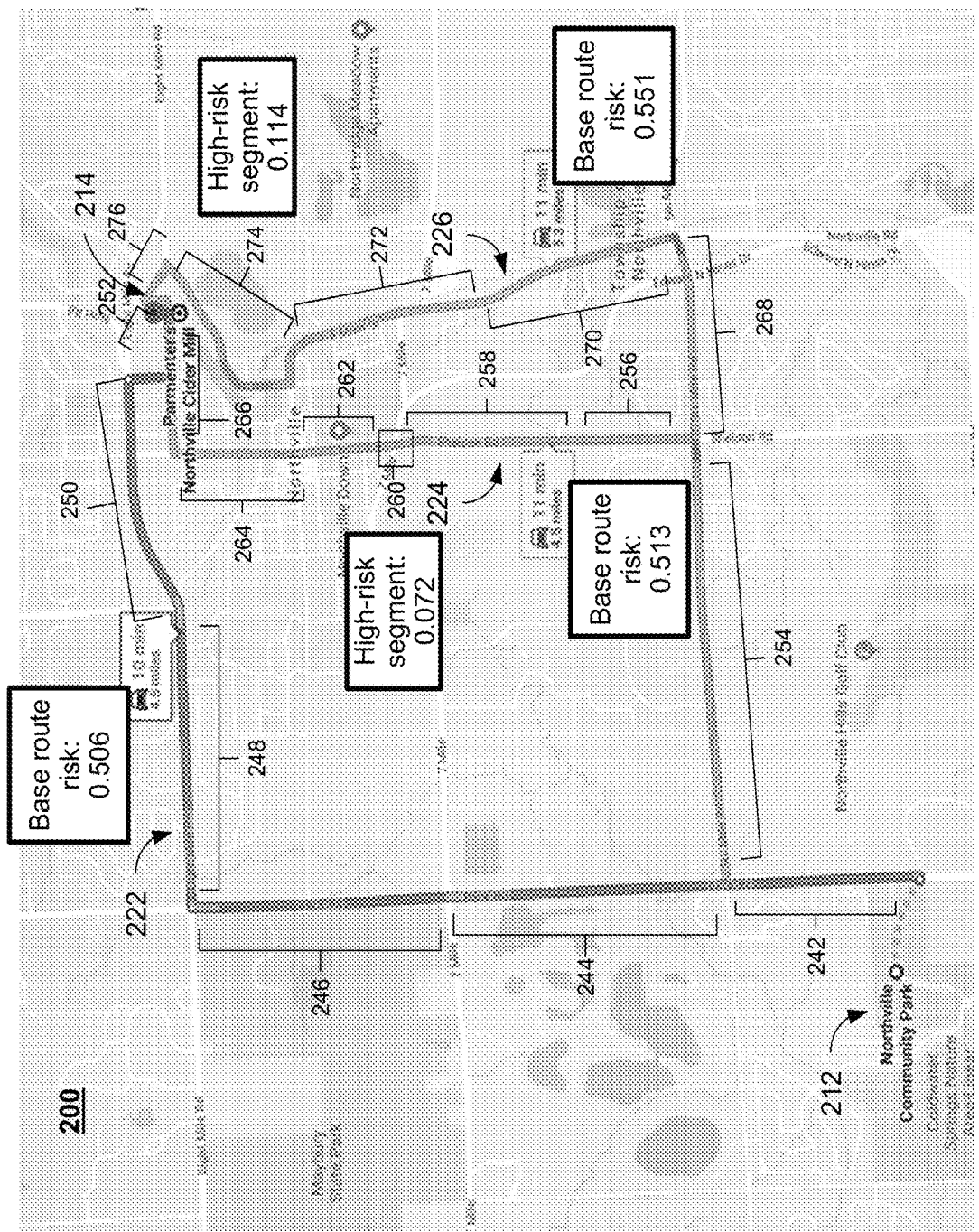
FIG. 6 depicts the example map of FIG. 3B, further displaying base risk values associated with road segments and routes, in accordance with some embodiments.

FIG. 6 depicts the map 200 as previously shown in FIG. 3B, with additional indicators of risk values associated with each of the routes 222, 224, and 226, as well as each of the road segments 260 and 274. More particularly, FIG. 6 depicts "base risk values" associated with the routes and segments. Although base risk values may take into account live traffic and/or weather conditions, base risk values are independent of any particular driver (e.g., determined independently of driver profiles).

Although base risk values are only displayed for the segments 260 and 274 in FIG. 6, it should be understood that any of the depicted road segments may have base risk values associated therewith, and base risk values may vary among any two road segments.

As shown in FIG. 6, a riskiest of the three depicted routes (e.g., highest base risk value) is the route 226. Contributing to riskiness of the route 226 is the road segment 274, which is associated with particularly high base risk (e.g., due to sharp curves and potential for the vehicle to leave the road and enter water, and/or due to increased likelihood of drivers to send texts along the segment 274). The route with the next highest risk is the route 224. Contributing to riskiness of the route 224 is the road segment 260, which is similarly associated with high base risk (e.g., due to an intersection having no protected left turns and/or having poor visibility of traffic coming from one or more directions). The safest route, based at least in part upon the base risk values, is the route 222.

The base risk values as shown in FIG. 6 may correlate at least partially to risk for any given driver. That is, where a significant hazard exists in a particular road segment, that hazard often presents increased risk for any driver, regardless of driving habits. However, habits of drivers often vary enough that, from a same group of two or more routes, the "safest route" for different drivers may be different ones of the two or more routes, as will be observed from FIG. 7.

Figure 7:
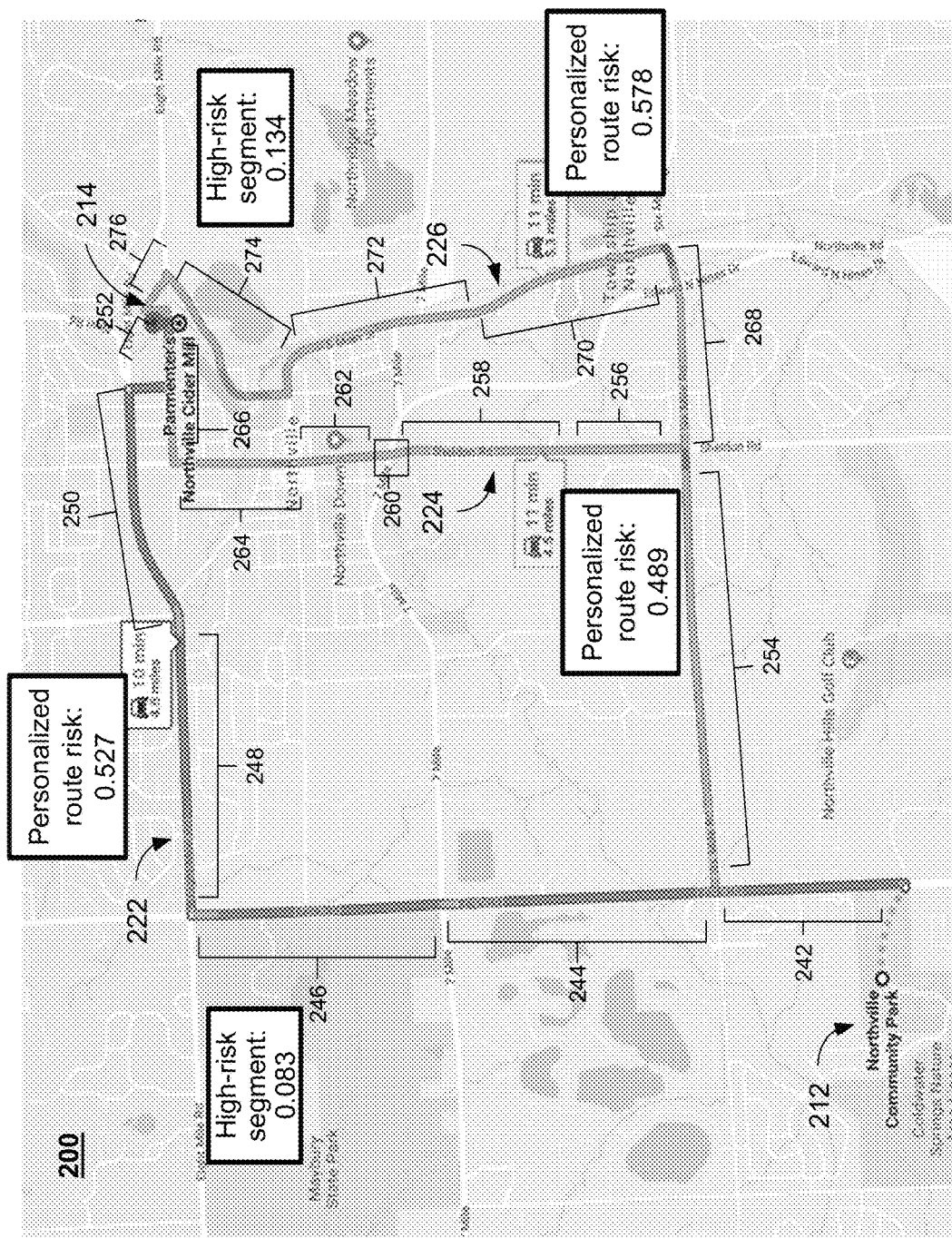
FIG. 7 depicts the example map of FIG. 6, modified to display personalized risk values associated with road segments and routes, in accordance with some embodiments.

FIG. 7 depicts the map 200 as shown in FIG. 6, modified to reflect determination of personalized risk values for the routes 222, 224, and 226, and for road segments 246 and 274. The personalized risk values indicate risk corresponding to a particular driver based at least in part upon a corresponding driver profile. Although personalized risk values are only displayed for the segments 246 and 274 in FIG. 7, it should be understood that any of the depicted road segments may have base risk values associated therewith, and the personalized risk values may vary among any two road segments.

As shown in FIG. 7, a personalized risk value may differ from a base risk value for any route or segment. For example, although base risk values in FIG. 6 indicated route 222 as the safest route, incorporation of the driver profile changes the risk values such the route 224 is the safest route for the particular driver. This change may be caused, for example, by the particular driver have driving habits that make the segment 260 significantly less hazardous for the driver (e.g., the driver has careful acceleration and braking habits at intersections, particularly those with unprotected left turns or low visibility). Conversely, the driver may have habits that make the segments 246 and 274 significantly more hazardous for the driver (e.g., the driver handles curves at high speeds, or the driver exhibits distracted driving that makes the driver prone to animal collisions near state parks).

In accordance with the changes to risk as shown in FIG. 7, it may be advisable for the driver to use the route 224, instead of the routes 222 or 226 that might otherwise be recommended (e.g., by existing navigation techniques). In some embodiments, the determination of personalized route risk values described herein may be at least partially based at least in part upon route length (e.g., in terms of time and/or distance), so that substantially longer routes are not recommended when those substantially longer routes are associated with only a negligible decrease in risk.

Example Graphical User Interfaces

Figure 8:
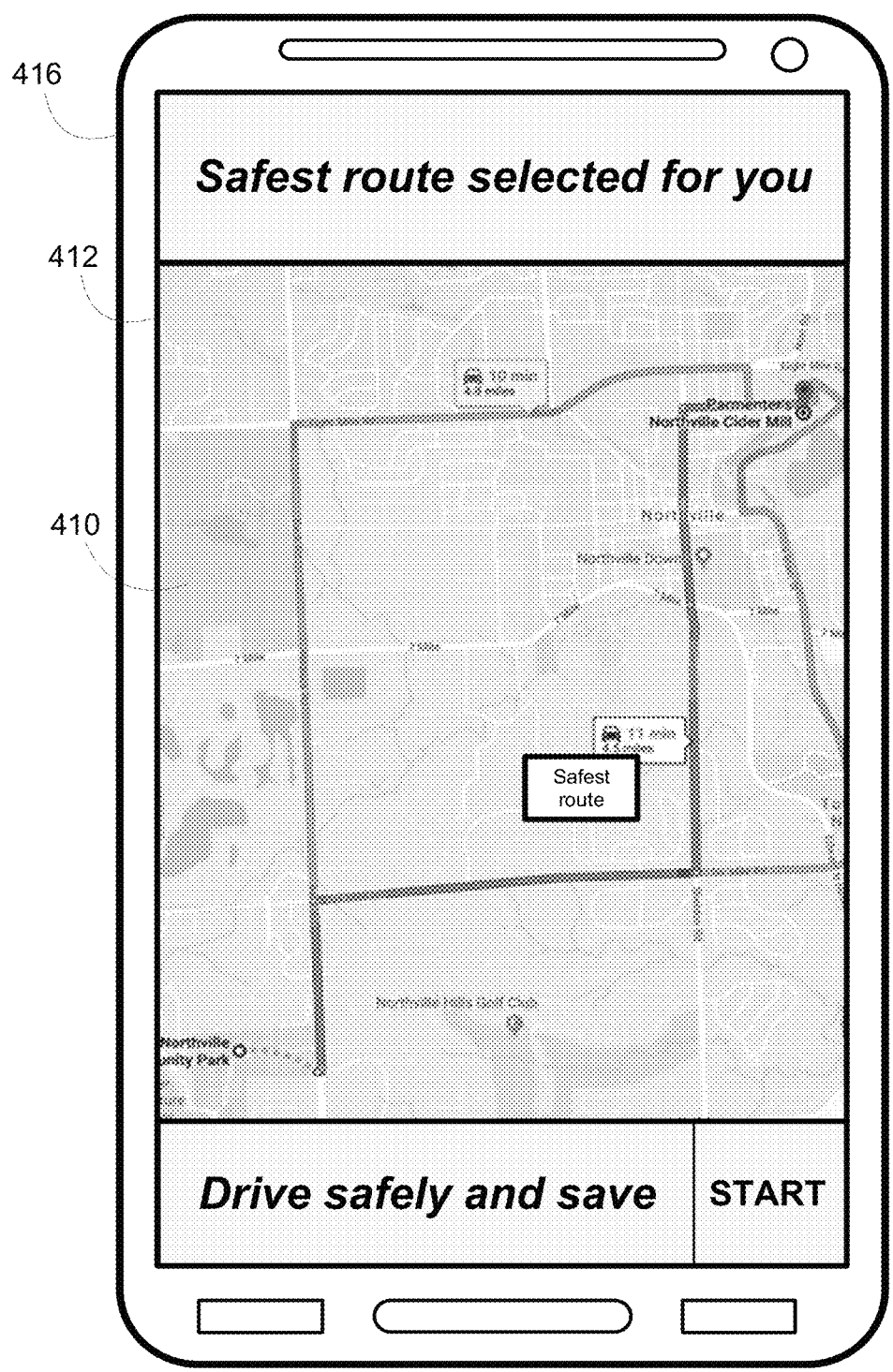
FIG. 8 depicts an example graphical user interface of an electronic computing device, in accordance with some embodiments.

FIG. 8 depicts an example graphical user interface 410 (GUI) that may be displayed, for example, via a touchscreen display 412 ("screen") of an electronic computing device 416 of a driver. Although a mobile computing device is depicted (e.g., mobile device 44 and/or 116), it should be understood that the GUI 410 may be displayed at other electronic computing devices, (e.g., at a screen of a vehicle data system having navigation functionalities, e.g., vehicle data system 46). Furthermore, the electronic computing device 416 may have additional components to those depicted in FIG. 8, including suitable components described herein (e.g., components of the mobile device 116 in FIG. 2).

Via the GUI 410, the safest route is shown for travel between the driver's origin and destination (corresponding to route 224 from FIGS. 6 and 7). In response to a user interaction with a control included in the GUI 410 (e.g., tapping the "START" control), the electronic computing device 416 may provide location monitoring and navigation along the safe route. In certain examples, in response to a different user interaction with the GUI 410 (e.g., tapping one of the other depicted routes), the electronic computing device 416 navigation according to one of the other possible routes. In some embodiments, the driver may expressly "opt-in" to collection of data from the electronic computing device 416, wherein the collected data is used to determine whether the driver followed the safe routes provided to the driver. Vehicle insurance discounts and/or other rewards may be provided to drivers who use safe routes.

In various embodiments, the user interface as shown in FIG. 8 may be modified to include additional, fewer, and/or alternative elements, including for example any of the graphical elements depicted in FIGS. 6 and/or 7 (e.g., to specify the degree to which particular routes or segments are safer). For example, in response to receiving a user interaction of the "safe route" element (e.g., a touchscreen tap), the electronic computing device 416 may display graphical elements of FIGS. 6 and/or 7 that set forth why the selected route is in fact the safest route for the driver (e.g., displaying route segments and personalized risk values corresponding therewith).

Example Methods

Figure 9:
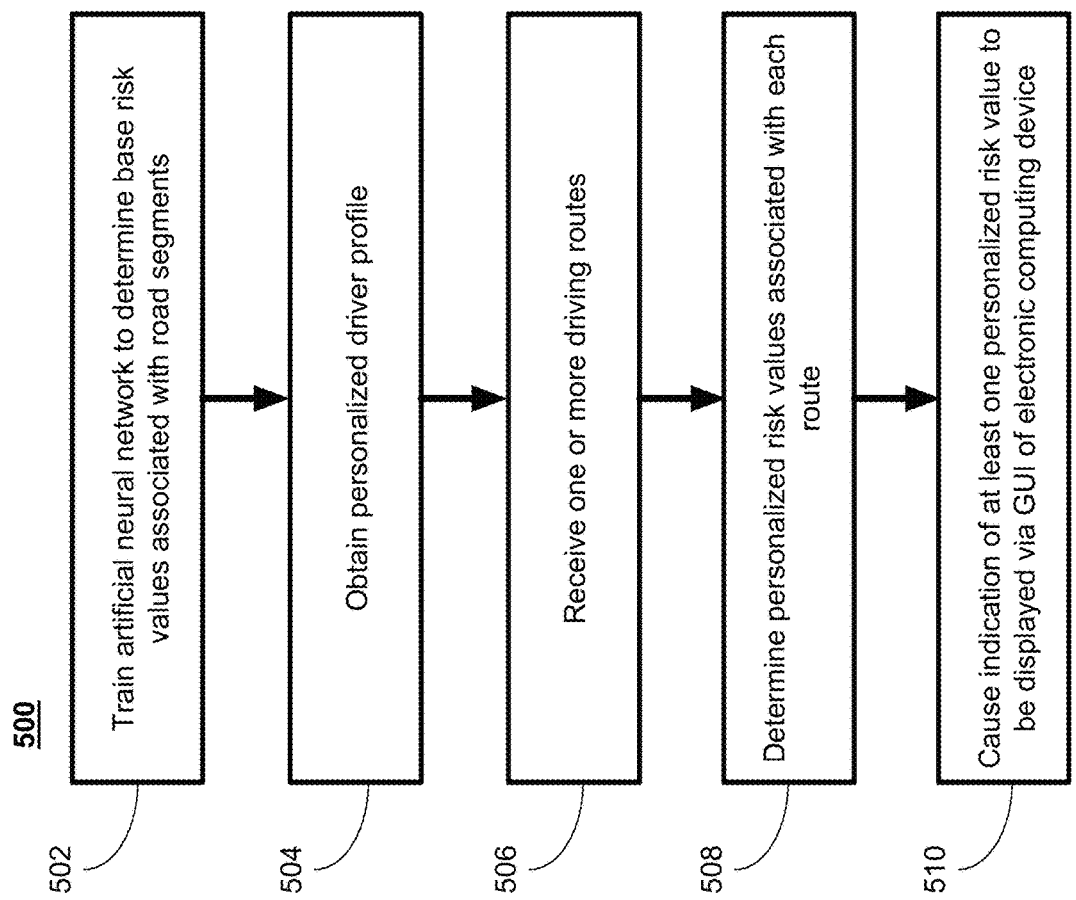
FIG. 9 depicts an example computer-implemented method for determining personalized risk associated with a driving route, in accordance with some embodiments.

FIG. 9 illustrates an example computer-implemented method 500 for determining personalized risk associated with a driving route, in accordance with some embodiments. The method 500 may be performed, for example, by the server 130 of FIG. 2, by the mobile computing device of FIGS. 1 and/or 2, and/or by other computing entities described herein, including combinations thereof. In some embodiments, actions of the method 500 may be performed via one or more processors executing non-transitory computer-executable instructions stored via one or more computer memories (e.g., processor and memory of a server). In some embodiments, one or more non-transitory computer-readable media may store non-transitory computer-executable instructions that, when executed via one or more processors, cause the one or more processors to perform actions described herein.

The method 500 may include a process 502 of training a machine learning model to determine base risk values associated with road segments. Particularly, the training may be performed using labeled training data indicative of risk associated with operations of vehicles (e.g., driving operations). More specifically, the labeled training data may include data indicative of insurance claim frequency and/or insurance claim severity (e.g., claim frequency/severity associated with incidents reflected by data including a road type, road segment, road condition, weather, traffic, vehicle telematics data, etc.). The machine learning model may include an artificial neural network (e.g., a recurrent neural network). The recurrent neural network may include a plurality of hidden layers, and training the artificial neural network may include determining respective weights of at least one of (1) one or more respective inputs each associated with at least one of a road type, road condition, or driving behavior, and (2) one or more outputs generated by one or more of the plurality of hidden layers. The machine learning model may include additional and/or alternative supervised machine learning models, such as a regression analysis, a k-nearest neighbors algorithm, a naïve Bayes model, a support-vector machine, a decision tree, or suitable combinations of the above.

The method 500 may also include a process 504 of obtaining, a personalized driver profile corresponding to the particular driver. In some embodiments, a driver profile may be generated based at least in part upon vehicle telematics data indicative of operation of one or more vehicles by a particular driver (e.g., in general conditions, in specific weather, in specific traffic patterns, on specific road segments, etc.).

The method 500 may further include a process 506 of receiving, via an electronic computing device corresponding to the particular driver, an indication of one or more driving routes corresponding to the particular driver. The electronic computing device may, for example, include a smartphone, another mobile computing device, or a vehicle data system. In some embodiments, two or more routes may be indicated. Two or more routes may, for example, be routes from a same origin to a same destination. In certain embodiments, the two or more routes may be routes from different origins to a same destination, or from a same origin to different destinations (e.g., two franchises of a same store, where a driver wants to know which franchise is the safest to drive to).

Each of the one or more driving routes comprising a respective plurality of road segments. In some embodiments, the respective plurality of road segments cover the entirety of the respective route.

The method 500 may still further include a process 508 of determining, for each of the one or more routes, a respective personalized risk value associated with the respective route. Particularly, the personalized risk value for a respective route may be determined by processing the respective plurality of road segments using the trained machine learning model and the personalized driver profile (e.g., to modify base risk values of corresponding road segments based at least in part upon the driver profile). In some embodiments, the personalized risk value of the respective route is a sum, average, or weighted average of personalized risk values associated with each of the respective plurality of road segments.

In some embodiments, a safest route for the particular driver is determined from two or more routes, based at least in part upon the determined personalized risk values (e.g., the lowest personalized risk value).

The method 500 may further include a process 510 of causing, for at least one of the one or more routes (e.g., the safest route, or the only route if only one route is present), an indication of the respective personalized risk value of the route to be displayed at a graphical user interface of the electronic computing device. An indication of a personalized risk value may, for example, include the personalized risk value itself (e.g., a numerical value). Additionally or alternatively, an indication of a personalized risk value for a route may include a qualitative evaluation of the risk value (e.g., indicating that the route is highly risky, moderately risky, or not risky, or indicating that the route is the safest among two or more routes).

In some embodiments, the method 500 may further include receiving further user interactions with the graphical user interface. For example, the method 500 may include receiving an indication of a user selection of the safest route (e.g., from the driver). The method 500 may further include, in response to receiving the indication of the user selection, providing a set of navigation instructions corresponding to the safest route, via the graphical user interface of the electronic computing device.

The method 500 may include additional, fewer, or alternate actions, in some embodiments. Particularly, unless specified otherwise, the method 500 may be performed in various suitable combinations with various other actions described in this detailed description.

Examples of Additional Considerations

Although the following text sets forth a detailed description of numerous different embodiments, it should be understood that the legal scope of the present disclosure may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing needs that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A computer-implemented method for determining personalized risk associated with a driving route, the computer-implemented method comprising:
    receiving, by one or more processors, a trained machine learning model to determine base risk values associated with road segments, wherein the trained machine learning model is trained using labeled training data indicative of risk associated with operation of vehicles, wherein the trained machine learning model includes one or more weights for at least one input selected from a group consisting of a road type and a road condition, and a road driving behavior;
    obtaining, by the one or more processors, a personalized driver profile corresponding to a driver, the personalized driver profile being based at least in part upon vehicle telematics data indicative of operation of one or more vehicles by the driver;
    receiving, by the one or more processors, via an electronic computing device corresponding to the driver, an indication of one or more driving routes corresponding to the driver, each of the one or more driving routes comprising a respective plurality of road segments;
    determining, by the one or more processors, for each of the one or more routes, a respective personalized risk value associated with the respective route, at least by processing the plurality of road segments using the trained machine learning model and the personalized driver profile; and
    causing, via the one or more processors, for at least one of the one or more routes, an indication of the respective personalized risk value of the route to be displayed at a graphical user interface of the electronic computing device.

2. The computer-implemented method of claim 1, wherein the trained machine learning model includes a trained artificial neural network.

3. The computer-implemented method of claim 2, wherein the trained artificial neural network is a recurrent neural network having a plurality of hidden layers, and wherein the trained artificial neural network includes one or more weights for one or more outputs generated by one or more of the plurality of hidden layers.

4. The computer-implemented method of claim 1, wherein the indication of one or more driving routes is an indication of two or more driving routes,
    wherein determining the respective personalized risk value for each of the two or more routes includes determining a safest route from among the two or more routes, based at least in part upon the determined personalized risk values,
    and wherein causing the indication of the respective personalized risk value to be displayed comprises causing an indication of the safest route to be displayed at the graphical user interface of the electronic computing device.

5. The computer-implemented method of claim 4, wherein causing the indication of the safest route to be displayed comprises causing the personalized risk value of the safest route to be displayed at the graphical user interface of the electronic computing device.

6. The computer-implemented method of claim 4, wherein each of the two or more driving routes includes a same origin and a same destination.

7. The computer-implemented method of claim 4, further comprising:
    receiving, by the one or more processors, via the graphical user interface of the electronic computing device, an indication of a user selection of the safest route; and
    in response to receiving the indication of the user selection of the safest route, providing, by the one or more processors, a set of navigation instructions corresponding to the safest route via the graphical user interface of the electronic computing device.

8. The computer-implemented method of claim 1, wherein the labeled training data includes data indicative of at least one of insurance claim frequency or insurance claim severity.

9. The computer-implemented method of claim 1, wherein the labeled training data includes data indicative of variable weather or traffic conditions at the road segments.

10. A computer system configured to determine personalized risk associated with a driving route, and the computer system comprising:
   one or more processors; and
   one or more memories storing computer-executable instructions that, when executed by the one or more processors, cause the computer system to:
      receive a trained machine learning model to determine base risk values associated with road segments, wherein the trained machine learning model is trained using labeled training data indicative of risk associated with operation of vehicles, wherein the trained machine learning model includes one or more weights for at least one input selected from a group consisting of a road type and a road condition, and a road driving behavior,
      obtain a personalized driver profile corresponding to a driver, the personalized driver profile being based at least in part upon vehicle telematics data indicative of operation of one or more vehicles by the driver,
      receive, via an electronic computing device corresponding to the driver, an indication of one or more driving routes corresponding to the driver, each of the one or more driving routes comprising a respective plurality of road segments,
      determine, for each of the one or more routes, a respective personalized risk value associated with the respective route, at least by processing the plurality of road segments using the trained machine learning model and the personalized driver profile, and
      cause, for at least one of the one or more routes, an indication of the respective personalized risk value of the route to be displayed at a graphical user interface of the electronic computing device.

11. The computer system of claim 10, wherein the trained machine learning model includes a trained artificial neural network.

12. The computer system of claim 11, wherein the trained artificial neural network is a recurrent neural network having a plurality of hidden layers, and wherein the trained artificial neural network includes one or more weights for one or more outputs generated by one or more of the plurality of hidden layers.

13. The computer system of claim 10, wherein the indication of one or more driving routes is an indication of two or more driving routes,
   wherein the instructions to determine the respective personalized risk value for each of the two or more routes include instructions to determine a safest route from among the two or more routes, based at least in part upon the determined personalized risk values,
   and wherein the instructions to cause the indication of the respective personalized risk value to be displayed comprise instructions to cause an indication of the safest route to be displayed at the graphical user interface of the electronic computing device.

14. The computer system of claim 13, wherein the instructions to cause the indication of the safest route to be displayed comprise instructions to cause the personalized risk value of the safest route to be displayed at the graphical user interface of the electronic computing device.

15. The computer system of claim 13, wherein each of the two or more driving routes includes a same origin and a same destination.

16. The computer system of claim 13, wherein the non-transitory computer-executable instructions further include instructions that, when executed by the one or more processors, cause the computer system to:
   receive, via the graphical user interface of the electronic computing device, an indication of a user selection of the safest route; and
   in response to receiving the indication of the user selection of the safest route, provide a set of navigation instructions corresponding to the safest route via the graphical user interface of the electronic computing device.

17. The computer system of claim 10, wherein the labeled training data comprises data indicative of at least one of insurance claim frequency or insurance claim severity.

18. The computer system of claim 10, wherein the labeled training data comprises data indicative of variable weather or traffic conditions at the road segments.

19. One or more non-transitory, computer-readable media for determining personalized risk associated with a driving route, the one or more computer-readable media storing instructions that, when executed by one or more processors, cause the one or more processors to:
   receive a trained machine learning model to determine base risk values associated with road segments, wherein the trained machine learning model is trained using labeled training data indicative of risk associated with operation of vehicles, wherein the trained machine learning model includes one or more weights for at least one input selected from a group consisting of a road type and a road condition, and a road driving behavior;
   obtain a personalized driver profile corresponding to a driver, the personalized driver profile being based at least in part upon vehicle telematics data indicative of operation of one or more vehicles by the driver;
   receive, via an electronic computing device corresponding to the driver, an indication of one or more driving routes corresponding to the driver, each of the one or more driving routes comprising a respective plurality of road segments;
   determine, for each of the one or more routes, a respective personalized risk value associated with the respective route, at least by processing the plurality of road segments using the trained machine learning model and the personalized driver profile; and
   cause, for at least one of the one or more routes, an indication of the respective personalized risk value of the route to be displayed at a graphical user interface of the electronic computing device.

20. The one or more non-transitory, computer-readable media of claim 19, wherein the trained machine learning model includes a trained artificial neural network.

* * * * *